United States Patent
Padure

(10) Patent No.: US 10,742,120 B1
(45) Date of Patent: Aug. 11, 2020

(54) PULSE FREQUENCY MODULATION CONTROL OF A POWER CONVERTER

(71) Applicant: Dialog Semiconductor (UK) Limited, London (GB)

(72) Inventor: Marius Padure, Graz (AT)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 16/373,797

(22) Filed: Apr. 3, 2019

(30) Foreign Application Priority Data

Jan. 21, 2019 (DE) .................. 10 2019 200 697

(51) Int. Cl.
    *H02M 3/158*     (2006.01)
    *H02M 1/00*     (2006.01)
    *H02M 3/156*     (2006.01)

(52) U.S. Cl.
    CPC ....... *H02M 3/1582* (2013.01); *H02M 3/1584* (2013.01); *H02M 3/156* (2013.01);
(Continued)

(58) Field of Classification Search
CPC .... H02M 3/156; H02M 3/158; H02M 3/1588; H02M 3/155; H02M 3/1582;
(Continued)

(56) References Cited

U.S. PATENT DOCUMENTS 6,229,292 B1   5/2001   Redl et al.
6,791,306 B2   9/2004   Walters et al.
(Continued)

FOREIGN PATENT DOCUMENTS

DE   10 2016 206 098   3/2017
DE   10 2016 217 857   3/2018
DE   10 2016 220 715   3/2018

OTHER PUBLICATIONS

MPS AN058, Designing a Stable COT Converter for a Desired Load and Line Regulation, Prepared by Wei Yuan et al., Jan. 2012, pp. 1-14, www.MonolithicPower.com.
(Continued)

*Primary Examiner* — Bryan R Perez
(74) *Attorney, Agent, or Firm* — Saile Ackerman LLC; Stephen B. Ackerman

(57) ABSTRACT

A power converter such as e.g. a buck converter operated in pulse frequency modulation PFM mode and a method are presented. The power converter has an inductor, a switching element, threshold current generator, resistive element, threshold current comparator, a current sensing means, and a current injecting means. The switching element controls an inductor current flowing through the inductor. The threshold current generator generates a threshold current based on a comparison between a reference voltage and an output voltage. The resistive element generates a threshold voltage at a reference node. The threshold current comparator generates, by comparing said threshold voltage with an inductor voltage, a control signal for turning off or on the switching element. The current sensing means senses a current indicative of the inductor current. The current injecting means generates an injection current based on the current sensed by the sensing means.

19 Claims, 6 Drawing Sheets

(52) U.S. Cl.
CPC ............... *H02M 2001/0009* (2013.01); *H02M 2001/0012* (2013.01)

(58) Field of Classification Search
CPC .. H02M 3/157; H02M 3/1563; H02M 3/1584; H02M 2003/1566; H02M 2003/1557; H02M 2001/0012; H02M 2001/0009; H02M 2001/385
See application file for complete search history.

(56) References Cited

U.S. PATENT DOCUMENTS

| | | |
|---|---|---|
| 2017/0070145 A1 | 3/2017 | Childs et al. |
| 2018/0069468 A1 | 3/2018 | Childs et al. |
| 2018/0083524 A1 | 3/2018 | Childs et al. |
| 2019/0058398 A1* | 2/2019 | Sharifi ................ H02M 3/158 |

OTHER PUBLICATIONS

Power Electronics, "Hysteretic-Mode Converters Demystified, Part 1," by Masashi Nogowa, Texas Instruments, May 27, 2016, pp. 1-17, found: https://www.powerelectronics.com/print/16253.

Power Electronics, "Hysteretic-Mode Converters Demystified, Part 2," by Masashi Nogowa, Texas Instruments, Jun. 23, 2016, pp. 1-19, found: https://www.powerelectronics.com/print/16312.

Power Electronics, "Hysteretic-Mode Converters Demystified, Part 3," by Masashi Nogowa, Texas Instruments, Sep. 28, 2016, pp. 1-22, found: https://www.powerelectronics.com/print/16601.

"Ripple-Based Control of Switching Regulators—An Overview," by Richard Redl et al., IEEE Transactions on Power Electronics, vol. 24, No. 12, Dec. 2009, pp. 2669-2680.

German Office Action, File No. 10 2019 200 697.3, Applicant: Dialog Semiconductor (UK) Limited, dated Oct. 14, 2019, 8 pages, and English language translation, 9 pages.

\* cited by examiner

PULSE FREQUENCY MODULATION CONTROL OF A POWER CONVERTER

TECHNICAL FIELD

The present document relates to DC (Direct Current)/DC power converters. In particular, the present document relates to switched-mode power supplies SMPS such as e.g. buck converter or boost converter which are operated in pulse frequency modulation (PFM) current control mode.

BACKGROUND

Power converters such as buck converters or boost converters typically comprise one or more control loops for regulating their output voltages and/output currents. At an output terminal of such a power converter, an output capacitor is used to smoothen the output voltage of the power converter and to stabilize the control loop(s). Depending on the design of the power converter and the intended application scenario, a minimum capacitance and/or a minimum equivalent series resistance ESR of said output capacitor is required.

In general, stability of said control loops is an important design issue. In case of a load step, the output voltage and/or the output current of the power converter may start oscillating if stability criteria are not met. This undesirable oscillation (also denoted as ringing) may even result in audible noise and make the power converter unsuitable e.g. for noise-sensitive audio applications.

SUMMARY

The present document addresses the above mentioned technical problem. In particular, the present document addresses the technical problem of providing a power converter which is operated in PFM current control mode with improved control loop stability without increasing the capacitance or the ESR of the output capacitor. According to an aspect, a power converter may comprise an inductor, a switching element, threshold current generator, resistive element, threshold current comparator, a current sensing means, and a current injecting means. The switching element may be configured to control an inductor current flowing through the inductor. The threshold current generator may be configured to generate a threshold current based on a comparison between a reference voltage and an output voltage at an output terminal of the power converter. The resistive element may be configured to generate a threshold voltage at a reference node by translating said threshold current into said threshold voltage. The threshold current comparator may be configured to generate, by comparing said threshold voltage at said reference node with an inductor voltage at an input terminal of the inductor, a control signal for turning off or for turning on the switching element. The current sensing means may be configured to sense a current indicative of the inductor current. The current injecting means may be configured to generate an injection current based on the current sensed by the sensing means, and to adjust the threshold current by injecting the injection current into said reference node or into said threshold current generator.

The power converter may be operated in pulse frequency modulation PFM mode. For example, the power converter may be a buck converter or a boost converter operated in PFM mode. In particular, the power converter may be operated in peak current control mode in which case the threshold current generator is a peak current generator, the threshold current is a peak current, the threshold voltage is a peak voltage, and the threshold current comparator is a peak current comparator. Alternatively, the power converter may be operated in valley current control mode in which case the threshold current generator is a valley current generator, the threshold current is a valley current, the threshold voltage is a valley voltage, and the threshold current comparator is a valley current comparator. For example, the power converter may be operated in peak current control mode and the peak current comparator may be configured to generate a control signal for turning off the switching element if the peak voltage exceeds the inductor voltage. It should be noted that, although in the following description the focus is shifted towards the peak current control mode, the invention nevertheless covers the case in which the power converter is operated in valley current control mode.

The switching element may be implemented with any suitable device, such as, for example, a metal-oxide-semiconductor field effect transistor MOSFET, an insulated-gate bipolar transistor IGBT, a MOS-gated thyristor, or other suitable power devices. The switching element may have a gate to which a respective driving voltage or control signal may be applied to turn the switching element on (i.e. to close the switching element) or to turn the switching element off (i.e. to open the switching element).

For example, the switching element may serve as high-side switching element of the power converter, in which case an electrical connection between a supply voltage and the input terminal of the inductor is established whenever the switching element is closed (i.e. turned on). For example, the switching element may serve as high-side switching element of the power converter in case the power converter is operated in peak current control mode. Alternatively, the switching element may serve as low-side switching element of the power converter, in which case an electrical connection between the input terminal of the inductor and a reference potential (such as e.g. ground) is established whenever the switching element is closed (i.e. turned on). For example, the switching element may serve as low-side switching element of the power converter in case the power converter is operated in valley current control mode.

On the one hand, the threshold current generator, the resistive element, and the threshold current comparator form part of a primary current control loop for controlling the durations of the on-times (or off-times) of the switching element. On the other hand, the current sensing means and the current injecting means form part of an additional control loop and may be implemented with the help of one or more current mirrors. As described above, the current sensing means and the current injecting means are responsible for sensing, scaling and injecting the injection current in order to (directly or indirectly) adjust the threshold current on which said primary control loop is based. As an advantage, the additional control loop makes it possible to maintain stable operation of the primary control loop. More specifically, the additional control loop may guarantee stable operation of the primary control loop even if (a) a transconductance value of said threshold current generator is increased, (b) the capacitance of an output capacitor is decreased or (c) an equivalent series resistance ESR of the output capacitor is decreased.

The current sensing means may be configured to sense the current indicative of the inductor current such that the sensed current only comprises alternating current AC portions of the inductor current and does not comprise direct current DC portions of the inductor current. The latter DC portions of the inductor current would result in an offset of the threshold current generator and would thus detune the primary control loop. For instance, the power converter may comprise an output capacitor coupled between the output terminal of the power converter and a reference potential, and the current sensing means may be configured to sense the current indicative of the inductor current at a node between the output capacitor and said reference potential. In this way, DC portions of the inductor current may be avoided in a simple but efficient way. Alternatively or additionally, the current sensing means may be configured to sense the inductor current at the input terminal of the inductor or at an output terminal of the inductor when the switching element is turned on. More specifically, the current sensing means may be configured to sense the inductor current at the input terminal of the inductor or at an output terminal of the inductor only during times when the switching element is turned on. In this way, the sensed current does not exhibit any DC current information.

The current injecting means may be configured to inject the injection current into the reference node such that a voltage at the reference node increases when the inductor voltage decreases and such that the voltage at the reference node decreases when the inductor voltage increases. In this manner, voltage oscillations at the output terminal of the power converter may be efficiently counteracted.

The threshold current generator may comprise a voltage controlled current source VCCS configured to generate, based on a voltage difference between the output voltage and the reference voltage, a control current at an output node of the VCCS, and the current injecting means may be configured to adjust the threshold current by injecting the injection current into said output node of the VCCS. In particular, the current injecting means may be configured to choose an injection direction of the injection current into the output node of the VCCS such that a voltage at the output node of the VCCS increases when the inductor voltage decreases and such that the voltage at the output node of the VCCS decreases when the inductor voltage increases.

The control current generated by the VCCS may be directly forwarded as threshold current to the reference node at the output of the threshold current generator. However, the threshold current generator may also comprise a current source configured to generate a maximum threshold current at a coupling node, and a current shaping unit configured to generate, based on the control current generated by the VCCS and said maximum threshold current at the coupling node, the threshold current by limiting the control current based on said maximum threshold current. The current injecting means may be configured to adjust the threshold current by injecting the injection current into said coupling node.

Again, the current injecting means may be configured to choose an injection direction of the injection current into the coupling node such that a voltage at the coupling node increases when the inductor voltage decreases and such that the voltage at the coupling node decreases when the inductor voltage increases.

Further, the power converter may also comprise a second current source configured to generate a minimum threshold current, and the current shaping unit may be configured to generate, based on the control current generated by the VCCS and said minimum threshold current at the coupling node, the threshold current by limiting the control current based on said minimum threshold current.

The power converter may comprise an output voltage comparator configured to generate, based on a voltage difference between the output voltage and the reference voltage, a second control signal for turning on the switching element. The power converter may comprise an off-time control unit configured to generate, based at least on the control signal generated by the threshold current comparator, a third control signal for turning off the switching element for a constant off-time period. In other words, the off-time control unit may be configured to generate said third control signal when the control signal generated by the threshold current comparator indicates that the switching element must be turned off. The control signal, the second control signal and the third control signal may be e.g. binary signals with a first signal state indicating that the switching element should be turned on and a second signal state indicating that the switching element should be turned off.

The resistive element may have a pre-determined resistance ratio with regard to a resistance of the switching element when it is turned on. For instance, the resistive element may be implemented with a first MOSFET transistor and the switching element may be implemented with second MOSFET transistor such that a pre-determined resistance ratio between a drain-source resistance of the first MOSFET transistor in the on-state and a drain-source resistance of the second MOSFET transistor in the on-state is achieved. Thus, it becomes possible to simulate a voltage drop (i.e. the threshold voltage) over the resistive element which is representative for a voltage drop over the switching element (measured as the inductor voltage).

According to another aspect, a method for operating a power converter is described. The method may comprise steps which correspond to the features of the power converter described in the present document. In particular, the power converter may comprise an inductor, a switching element, threshold current generator, resistive element, threshold current comparator, a current sensing means, and a current injecting means. The method may comprise controlling, by the switching element, an inductor current flowing through the inductor. The method may comprise generating, by the threshold current generator, a threshold current based on a comparison between a reference voltage and an output voltage at an output terminal of the power converter. The method may comprise generating, by the resistive element, a threshold voltage at a reference node by translating said threshold current into said threshold voltage. The method may comprise generating, by the threshold current comparator, by comparing said threshold voltage at said reference node with an inductor voltage at an input terminal of the inductor, a control signal for turning off or for turning on the switching element. Finally, the method may comprise sensing, by the current sensing means, a current indicative of the inductor current, generating, by the current injecting means, an injection current based on the current sensed by the sensing means, and adjusting the threshold current by injecting the injection current into said reference node or into said threshold current generator.

Further, the sensing step may comprise sensing, by the current sensing means, the current indicative of the inductor current such that the sensed current only comprises alternating current AC portions of the inductor current and does not comprise direct current DC portions of the inductor current. This may be achieved e.g. by providing the power converter with an output capacitor coupled between the output terminal of the power converter and a reference potential. The sensing step may then comprise sensing the current indicative of the inductor current at a node between the output capacitor and said reference potential. Alternatively or additionally, the sensing step may comprise sensing the inductor current at the input terminal of the inductor or at an output terminal of the inductor when the switching element is turned on. Put in a different way, the inductor current may be sensed only during time intervals during which the switching element is turned on and the inductor current is flowing from the supply voltage via the switching element and the inductor to the output terminal of the power converter.

Moreover, the injecting step may comprise injecting the injection current into the reference node such that a voltage at the reference node increases when the inductor voltage decreases and such that the voltage at the reference node decreases when the inductor voltage increases.

The method may comprise generating, by a voltage controlled current source VCCS of the threshold current generator, based on a voltage difference between the output voltage and the reference voltage, a control current at an output node of the VCCS. The method may comprise adjusting, by the current injecting means, the threshold current by injecting the injection current into said output node of the VCCS.

Furthermore, the threshold current generator may comprise a current source and a current shaping unit, and the method may comprise generating, by the current source, a maximum threshold current at a coupling node. The method may comprise generating, by the current shaping unit, based on the control current generated by the VCCS and said maximum threshold current at the coupling node, the threshold current by limiting the control current based on said maximum threshold current. In this case, the method may comprise adjusting, by the current injecting means, the threshold current by injecting the injection current into said coupling node.

The method may comprise generating, by an output voltage comparator, based on a voltage difference between the output voltage and the reference voltage, a second control signal for turning on the switching element. The method may comprise generating, by an off-time control unit, based on the control signal generated by the threshold current comparator, a third control signal for turning off the switching element for a constant off-time period after the switching element has been turned off according to the control signal. The resistive element may have a pre-determined resistance ratio with regard to a resistance of the switching element when it is turned on.

According to a further aspect, a software program is described. The software program may be adapted for execution on a processor and for performing the method steps outlined in the present document when carried out by the processor.

According to another aspect, a storage medium is described. The storage medium may comprise a software program adapted for execution on a processor and for performing the method steps outlined in the present document when carried out by the processor.

According to a further aspect, a computer program product is described. The computer program product may comprise instructions for performing the method steps outlined in the present document when carried out by the processor.

It should be noted that the methods and systems including its preferred embodiments as outlined in the present document may be used stand-alone or in combination with the other methods and systems disclosed in this document. In addition, the features outlined in the context of a system are also applicable to a corresponding method. Furthermore, all aspects of the methods and systems outlined in the present document may be arbitrarily combined. In particular, the features of the claims may be combined with one another in an arbitrary manner.

In the present document, the term "couple", "connect", "coupled" or "connected" refers to elements being in electrical communication with each other, whether directly connected e.g., via wires, or in some other manner.

BRIEF DESCRIPTION OF THE DRAWINGS

The present invention is illustrated by way of example, and not by way of limitation, in the figures of the accompanying drawings in which like reference numerals refer to similar or identical elements, and in which.

DESCRIPTION

Figure 1:
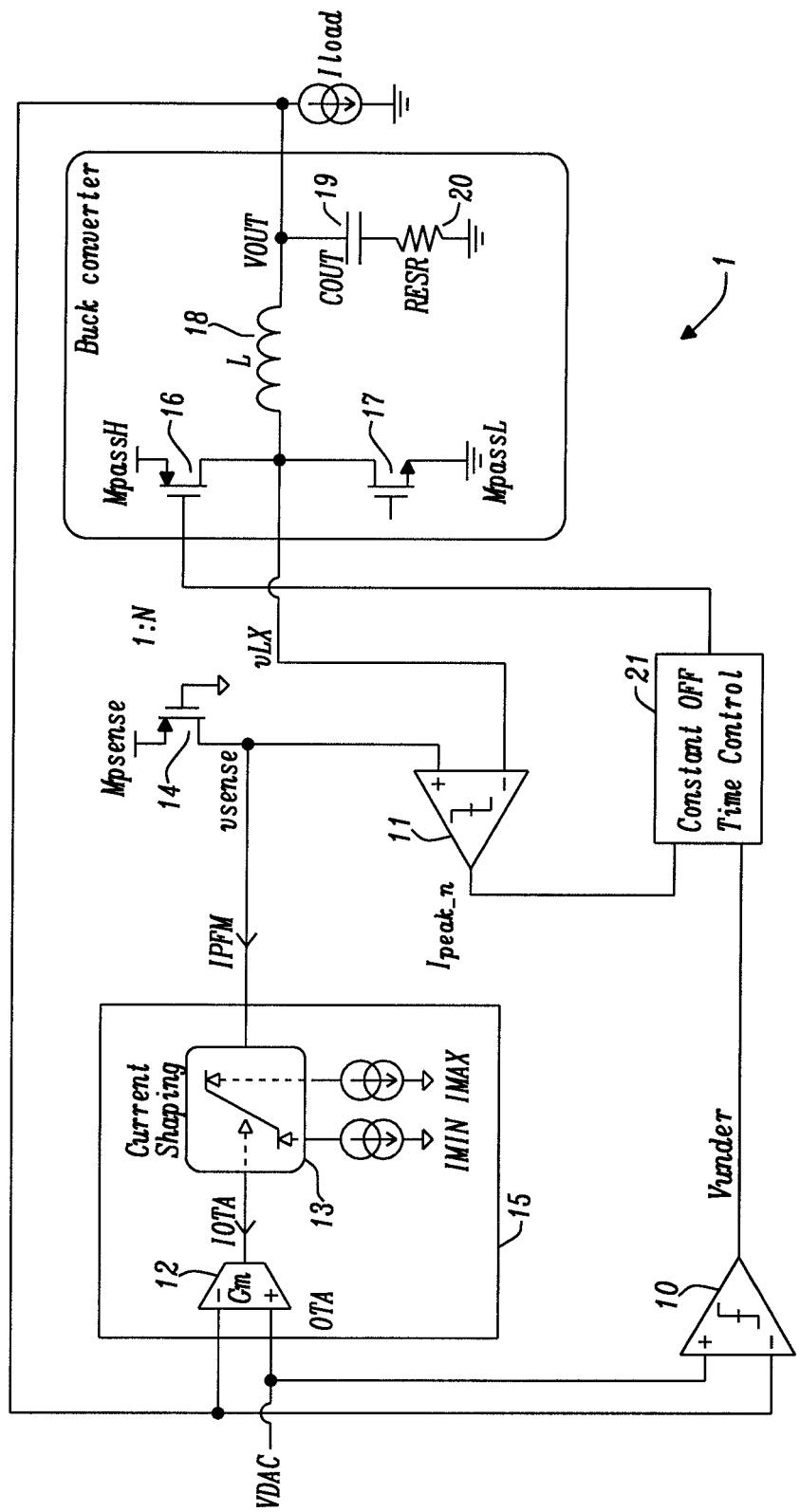
FIG. 1 shows a block diagram describing pulse frequency modulation control of a buck converter.

FIG. 1 shows a block diagram describing pulse frequency modulation control of an exemplary buck converter 1. The buck control system comprises a voltage comparator 10 (output voltage comparator) which has the non-inverting input connected to the voltage reference VDAC, the inverting input connected to the output voltage VOUT, and the output named Vunder. The voltage reference VDAC may be e.g. generated by a digital to analog converter DAC. The buck control system further comprises a current comparator 11 (threshold current comparator), which has the non-inverting input connected to the current reference vsense, the inverting input connected to the switching node of the buck converter vLX, and the output named Ipeak_n. The buck control system further comprises an operational trans-conductance amplifier OTA 12 (voltage controlled current source VCCS) which has the non-inverting input connected to VDAC, the inverting input connected to VOUT, and generates a current which is proportional to the voltage difference between VDAC and VOUT (IOTA). The buck control system further comprises a current shaping block 13 (current shaping unit) which receives three current inputs: two fixed current references IMIN/IMAX generated by two current sources, respectively, and a variable current IOTA and generates an output current, IPFM. The OTA 12 together with the current shaping block 13 forms a peak current generator 15 (also denoted as threshold current generator).

Moreover, the buck control system further comprise a current sense device 14 (Mpsense, i.e. a resistive element) which has a fixed size ratio 1/N with respect to the pass device 16 (MpassH, switching element) of the buck converter. The current sense device 14 is connected to both IPFM line and to the non-inverting input of the Ipeak comparator 11. The depicted buck converter also comprises a low-side switching element 17, an inductor 18, and an output capacitor 19. The resistor 20 illustrated in FIG. 1 represents the equivalent series resistance ESR of the output capacitor 20.

Figure 2:
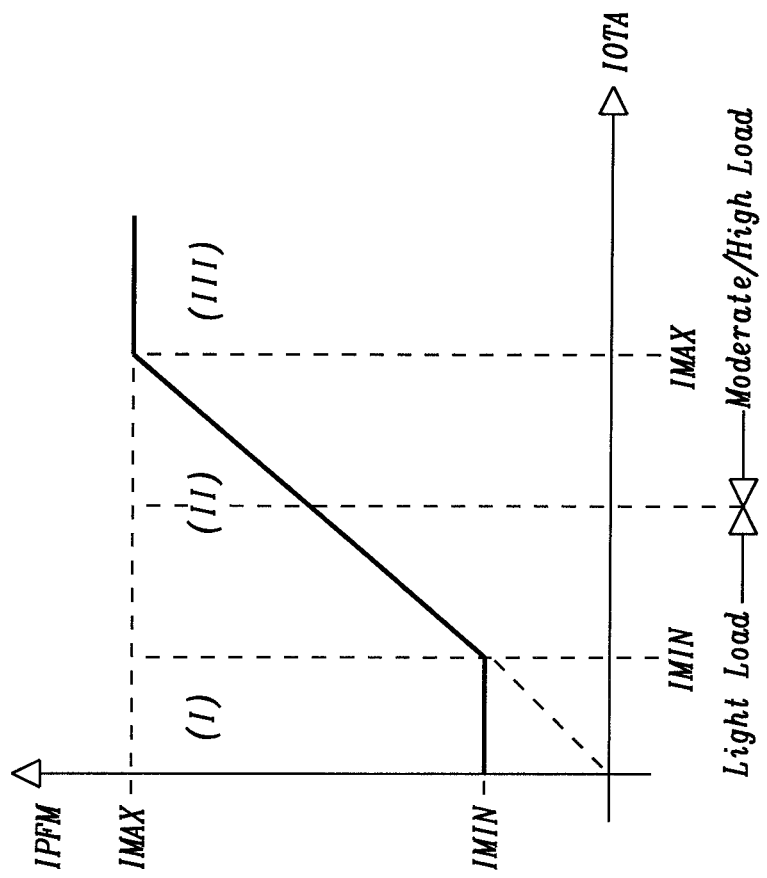
FIG. 2 shows the static characteristic of an exemplary current shaping block.

FIG. 2 shows the static characteristic of an exemplary current shaping block 13. The output current IPFM going to the current sense device 14 can be formulated mathematically as:

$$I_{PFM} = \max(IMIN, \min(IOTA, IMAX))$$

As can be seen in FIG. 2, there are three buck operation regions:
1) Region (I) (IOTA<IMIN): the current shaping block 13 limits the peak coil current to IMIN. The buck converter operates in light load condition;
2) Region (II) (IMIN<IOTA<IMAX): due to load increase, the current shaping block 13 detects that the peak coil current has to be greater than IMIN. The buck converter operates in moderate load condition;
3) Region (III) (IOTA>IMAX): the current shaping block 13 limits the peak coil current to IMAX. The buck converter operates in high load condition, and the peak coil current has to be limited.

Figure 3:
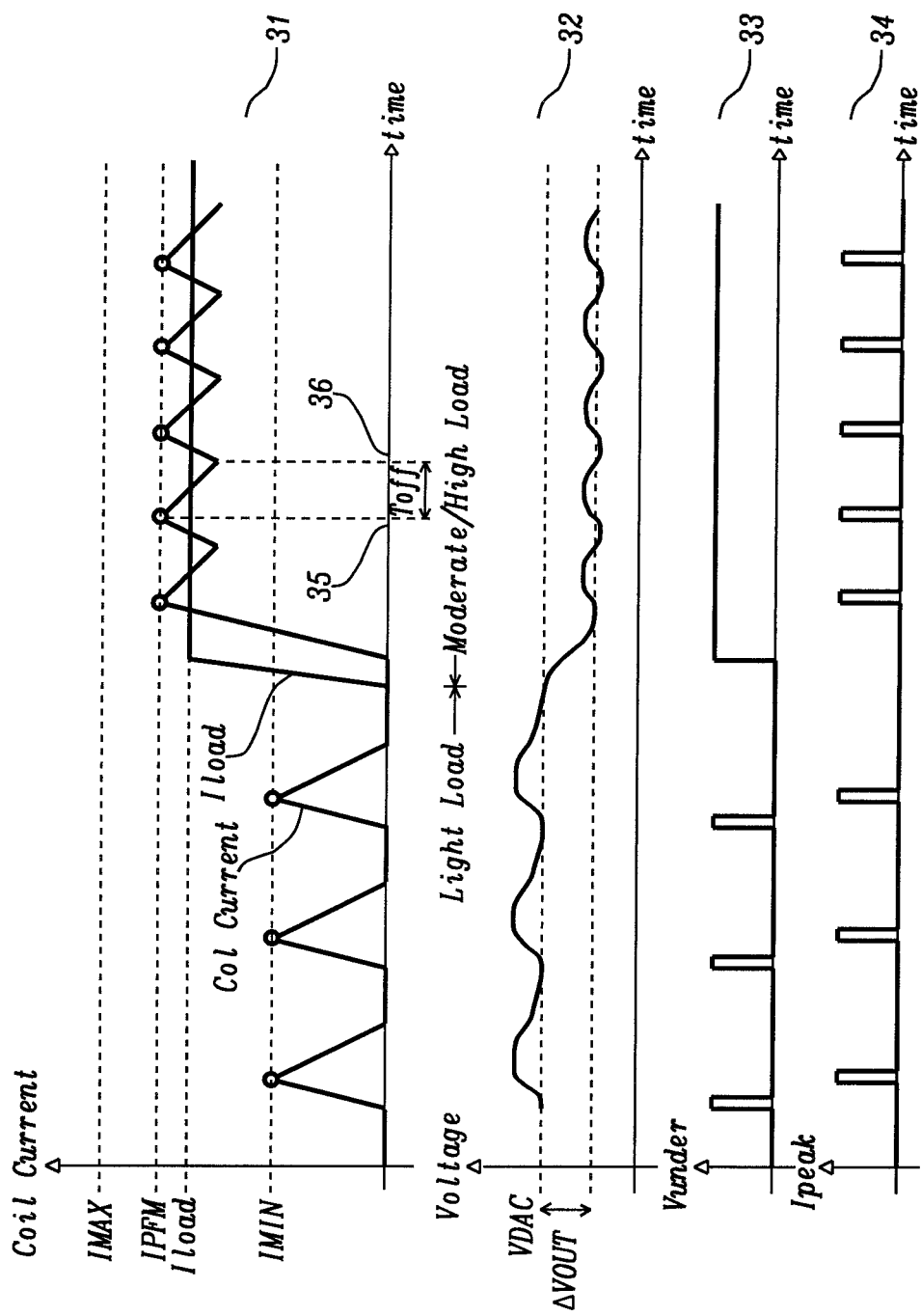
FIG. 3 shows exemplary waveforms of signals within an exemplary buck converter.

FIG. 3 shows exemplary waveforms of signals within an exemplary buck converter. The first diagram illustrates the inductor current 31 over time, the second diagram illustrates the output voltage 32 at the output terminal of the power converter over time, the third diagram illustrates a control signal 33 (second control signal) for turning on the pass device 16 over time, and the fourth diagram illustrates a control signal 34 (control signal) generated by the current comparator 11 for turning off the pass device 16 over time. An off-time control unit 21 generates, based on the control signal generated by the current comparator 11, a further control signal for turning off the pass device 16 for a constant off-time period.

Under light load operation, every cycle the on-time (Ton) of the pass device 16 is started by the voltage comparator 10 and is stopped by the current comparator 11. As the output voltage stays in average above the VDAC, the OTA 12 will not control actively the coil peak current. Instead, the current shaping block 13 is controlling the coil peak current via the IMIN setting.

Under moderate/high load operation, as the output voltage drops, the Vunder signal is permanently high and the IOTA current will start to increase the coil peak current, IPFM, according to Region II from FIG. 2. After the current comparator 11 generates a logic high output, a fixed TOFF time is generated by the off-time control unit 21. In FIG. 3, the fixed TOFF time extends between time 35 and 36, for example.

The buck output impedance equals:

$$R_{out} = \frac{\Delta VOUT}{Iload} = \frac{\Delta VOUT}{N \cdot IOTA} = \frac{1}{N \cdot G_m}$$

where Gm is the trans-conductance of the OTA 12 and N is the MpassH to Mpsense size ratio, i.e. the ratio of the resistance values of the pass device 16 to the current sense device 14. It is worth noting that a low output impedance of the buck converter will be controllable by using an OTA 12 with a high trans-conductance Gm. Unfortunately, increasing the trans-conductance Gm and keeping the same output capacitor value will lead to large signal instability.

Figure 4:
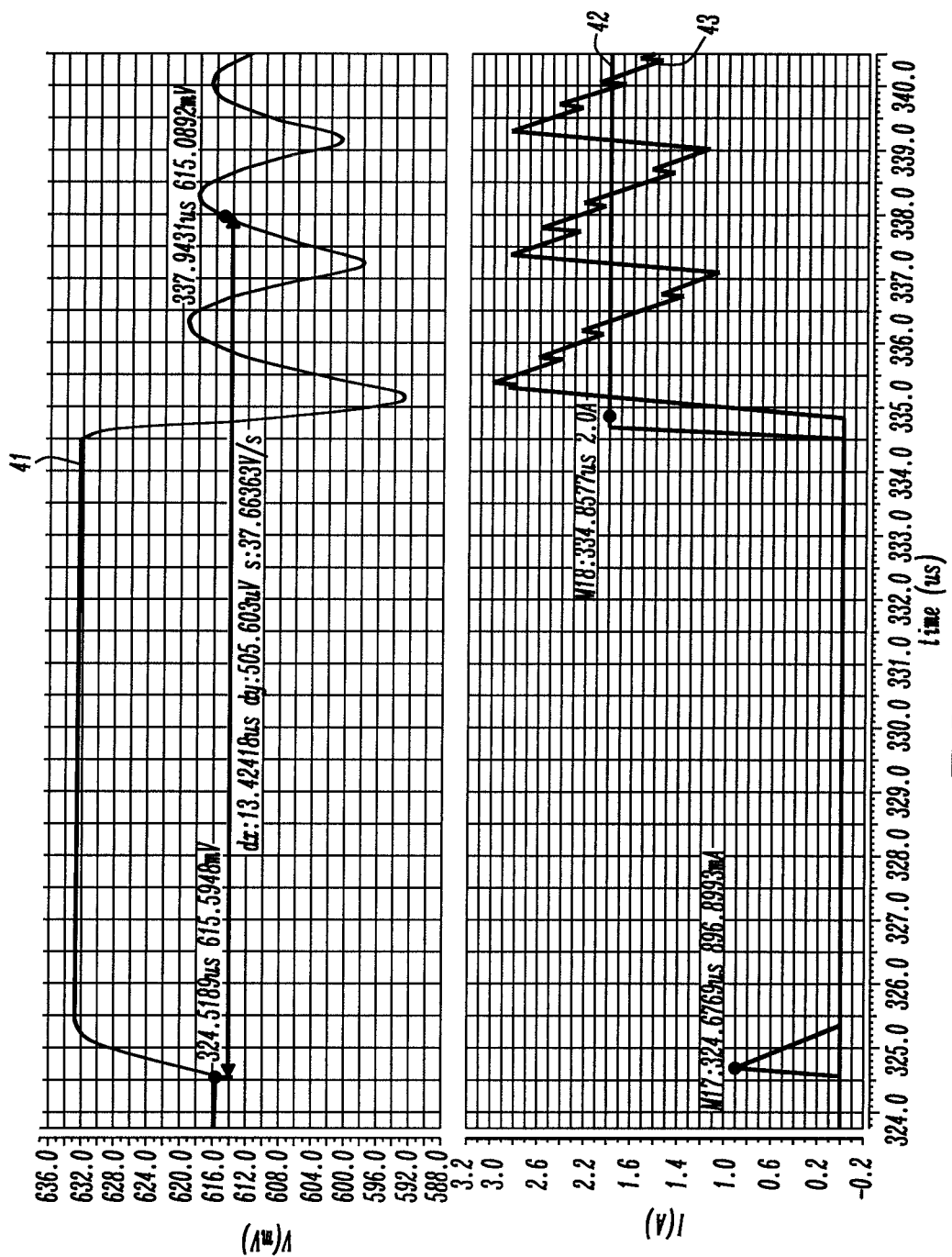
FIG. 4 shows simulation results indicating voltage oscillations at the output of the power converter.

A typical large signal instability simulation scenario is presented in FIG. 4. In this simulation, the trans-conductance of the OTA 12 increased by a factor of 5, while the capacitance value of the output capacitor 19 is kept constant. Signal 41 shows the output voltage, signal 42 indicates the load step applied to the system, and signal 43 illustrates the inductor current which shows undesirable oscillation after the load step is applied.

In the context of PFM systems with constant off-time control as illustrated in FIGS. 1 and 3, the parasitic resistor 20 of the output capacitor 19 needs to have a certain minimum value given by the below formula in order to guarantee stable operation:

$$RESR \times COUT \geq TOFF/2$$

However, the minimum RESR requirement of the parasitic resistor 19 has the drawback that it can generate an undesirable amount of output voltage ripple. This has been recognized and addressed in several prior art documents.

Figure 5:
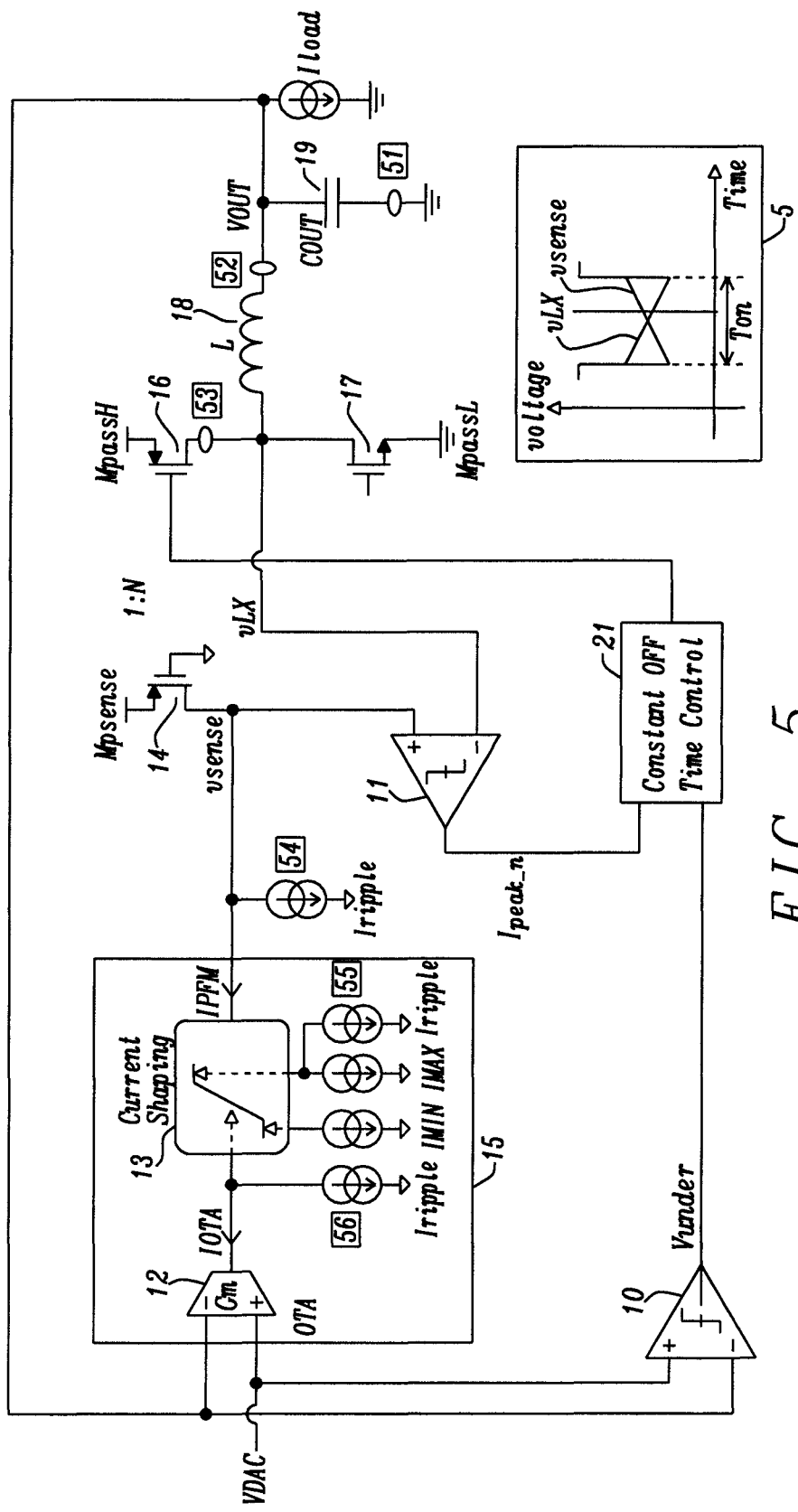
FIG. 5 shows an exemplary buck converter according to the invention.

FIG. 5 now shows an exemplary buck converter according to the teachings of the present invention. The reference numerals of most circuit elements are the same as in FIG. 1, indicating that those reference numerals denote identical circuit elements. A primary technical objective of this invention is to maintain stable operation of the power converter with an increased trans-conductance of the OTA 12 stage, and without changing the output capacitor 19 value (COUT) and/or adding a minimum RESR requirement for COUT. This objective may be achieved e.g. by the circuit illustrated in FIG. 5.

In addition to the circuit elements already presented in the context of FIG. 1, the illustrated system comprises current sensing means 51, 52, 53 for sensing a current indicative of the inductor current; and current injecting means 54, 55, 56 for generating an injection current based on the current sensed by the sensing means 51, 52, 53, and for adjusting the output current IPFM of the current shaping block 13 (and therewith also the voltage vsense) by injecting the injection current into at least one of the three depicted locations of the circuit. In practice, at least one of the three positions for sensing the current indicative of the inductor current has to be selected. Further, at least one of the three positions for injection the injection current has to be selected. In case current sensing means 52 or 53 are selected, the inductor current may be sensed only the pass device 16 is turned on in order to extract only AC components of said inductor current.

In addition to the stability advantage, the use of the proposed technique may result in the following benefits: The method improves the static load regulation without using a slow DC loop (i.e. a "servo"). Additionally, when compared with a servo-based control loop system, the voltage undershoot/overshoot performance in load transients will be better as the native current information is not processed by the OTA 12.

In the illustrated example, it may be important that the sensed coil current should not have DC current information (otherwise this will be treated by the OTA 12 as an offset). Furthermore, the direction of the scaled coil current within the injection points should be such that the direction of the voltage, e.g. within the vsense node, should go opposite the direction of the voltage vLX of the switching node. This is also illustrated in sub-diagram 5 in FIG. 5.

Figure 6:
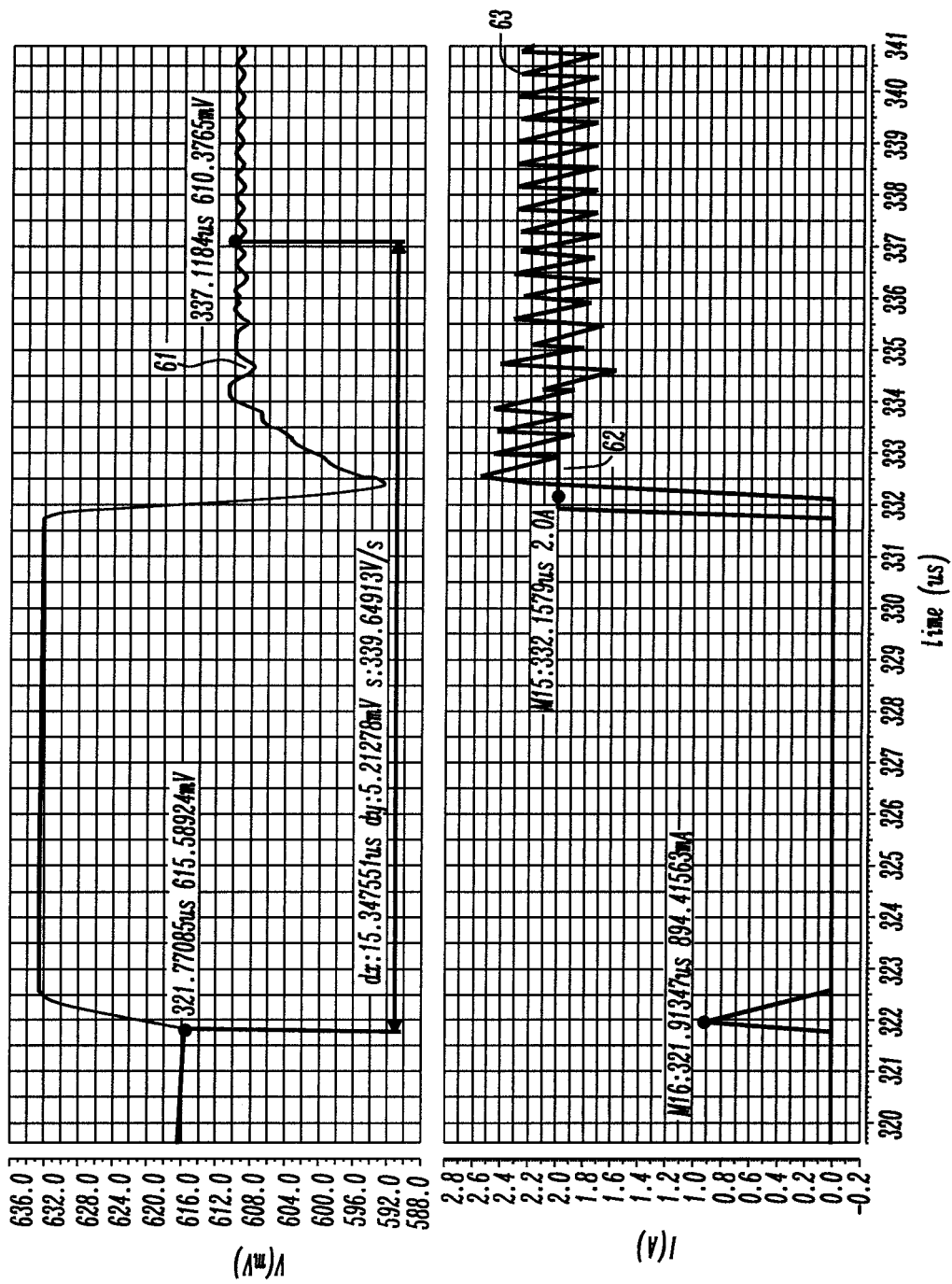
FIG. 6 shows simulation results without voltage oscillations at the output of the power converter.

Finally, FIG. 6 shows simulation results without voltage oscillations at the output of the power converter. These simulation results are achieved by the circuit depicted in FIG. 5. Again, signal 61 shows the output voltage, signal 62 indicates the load step applied to the system, and signal 63 illustrates the inductor current. It should be noted that in the used exemplary simulation setup the output impedance is approximately 5.2 mV/2A=2.6mΩ.

It should be noted that the description and drawings merely illustrate the principles of the proposed methods and systems. Those skilled in the art will be able to implement various arrangements that, although not explicitly described or shown herein, embody the principles of the invention and are included within its spirit and scope. Furthermore, all examples and embodiment outlined in the present document are principally intended expressly to be only for explanatory purposes to help the reader in understanding the principles of the proposed methods and systems. Furthermore, all statements herein providing principles, aspects, and embodiments of the invention, as well as specific examples thereof, are intended to encompass equivalents thereof.

What is claimed is:

1. A power converter comprising
an inductor;
a switching element configured to control an inductor current flowing through the inductor;
a threshold current generator configured to generate a threshold current based on a comparison between a reference voltage and an output voltage at an output terminal of the power converter;
a resistive element configured to generate a threshold voltage at a reference node by translating said threshold current into said threshold voltage;
a threshold current comparator configured to generate, by comparing the threshold voltage at the reference node with an inductor voltage at an input terminal of the inductor, a control signal for turning off or for turning on the switching element;
a current sensing circuit configured to sense a current indicative of the inductor current; and
a current injecting circuit configured to generate an injection current based on a current sensed by the current sensing circuit, and to adjust the threshold current by injecting the injection current into said reference node or into said threshold current generator.

2. The power converter according to claim 1, wherein the current sensing circuit is configured to sense the current indicative of the inductor current such that the sensed current only comprises alternating current AC portions of the inductor current and does not comprise direct current DC portions of the inductor current.

3. The power converter according to claim 1, wherein the power converter further comprises an output capacitor coupled between the output terminal of the power converter and a reference potential, and wherein the current sensing circuit is configured to sense the current indicative of the inductor current at a node between the output capacitor and said reference potential.

4. The power converter according to claim 1, wherein the current sensing circuit is configured to sense the inductor current at the input terminal of the inductor or at an output terminal of the inductor when the switching element is turned on.

5. The power converter according to claim 1, wherein the current injecting circuit is configured to inject the injection current into the reference node such that a voltage at the reference node increases when the inductor voltage decreases and such that the voltage at the reference node decreases when the inductor voltage increases.

6. The power converter according to claim 1, wherein the threshold current generator comprises a voltage controlled current source VCCS configured to generate, based on a voltage difference between the output voltage and the reference voltage, a control current at an output node of the VCCS, and the current injecting circuit is configured to adjust the threshold current by injecting the injection current into said output node of the VCCS.

7. The power converter according to claim 6, wherein the threshold current generator comprises
a current source configured to generate a maximum threshold current at a coupling node,
a current shaping unit configured to generate, based on the control current generated by the VCCS and said maximum threshold current at the coupling node, the threshold current by limiting the control current based on said maximum threshold current, and wherein the current injecting circuit is configured to adjust the threshold current by injecting the injection current into said coupling node.

8. The power converter according to claim 1, comprising an output voltage comparator configured to generate, based on a voltage difference between the output voltage and the reference voltage, a second control signal for turning on the switching element.

9. The power converter according to claim 1, comprising an off-time control unit configured to generate, based on the control signal generated by the threshold current comparator, a third control signal for turning off the switching element for a constant off-time period.

10. The power converter according to claim 1, wherein the resistive element has a pre-determined resistance ratio with regard to a resistance of the switching element when it is turned on.

11. A method of operating a power converter comprising an inductor, a switching element, a threshold current generator, a resistive element, a threshold current comparator, a current sensing circuit, and a current injecting circuit, the method comprising controlling, by the switching element, an inductor current flowing through the inductor;
generating, by the threshold current generator, a threshold current based on a comparison between a reference voltage and an output voltage at an output terminal of the power converter;
generating, by the resistive element, a threshold voltage at a reference node by translating said threshold current into said threshold voltage;
generating, by the threshold current comparator, by comparing the threshold voltage at the reference node with an inductor voltage at an input terminal of the inductor, a control signal for turning off or for turning on the switching element
sensing, by the current sensing circuit, a current indicative of the inductor current;
generating, by the current injecting circuit, an injection current based on a current sensed by the current sensing circuit; and
adjusting the threshold current by injecting the injection current into said reference node or into said threshold current generator.

12. The method according to claim 11, wherein comprises:
sensing, by the current sensing circuit, the current indicative of the inductor current such that the sensed current only comprises alternating current AC portions of the inductor current and does not comprise direct current DC portions of the inductor current.

13. The method according to claim 11, wherein the power converter further comprises an output capacitor coupled between the output terminal of the power converter and a reference potential, and wherein the sensing comprises sensing the current indicative of the inductor current at a node between the output capacitor and said reference potential.

14. The method according to claim 11, wherein sensing comprises
sensing the inductor current at the input terminal of the inductor or at an output terminal of the inductor when the switching element is turned on.

15. The method according to claim 11, wherein injecting comprises
injecting the injection current into the reference node such that a voltage at the reference node increases when the inductor voltage decreases and such that the voltage at the reference node decreases when the inductor voltage increases.

16. The method according to claim 11, comprising
generating, by a voltage controlled current source VCCS of the threshold current generator, based on a voltage difference between the output voltage and the reference voltage, a control current at an output node of the VCCS; and
adjusting, by the current injecting circuit, the threshold current by injecting the injection current into said output node of the VCCS.

17. The method according to claim 16, wherein the threshold current generator comprises a current source and a current shaping unit, the method comprising
generating, by the current source, a maximum threshold current at a coupling node;
generating, by the current shaping unit, based on the control current generated by the VCCS and said maximum threshold current at the coupling node, the threshold current by limiting the control current based on said maximum threshold current;
adjusting, by the current injecting circuit, the threshold current by injecting the injection current into said coupling node.

18. The method according to claim 11, the method comprising
generating, by an output voltage comparator, based on a voltage difference between the output voltage and the reference voltage, a second control signal for turning on the switching element.

19. The method according to claim 11, the method comprising
generating, by an off-time control unit, based on the control signal generated by the threshold current comparator, a third control signal for turning off the switching element for a constant off-time period.

* * * * *